Feb. 23, 1954

E. F. ROSSMAN 2,670,201

CONTROL MECHANISM

Filed Jan. 29, 1948

INVENTOR.
BY EDWIN F. ROSSMAN
HIS ATTORNEYS

Feb. 23, 1954 E. F. ROSSMAN 2,670,201
CONTROL MECHANISM
Filed Jan. 29, 1948 4 Sheets-Sheet 2
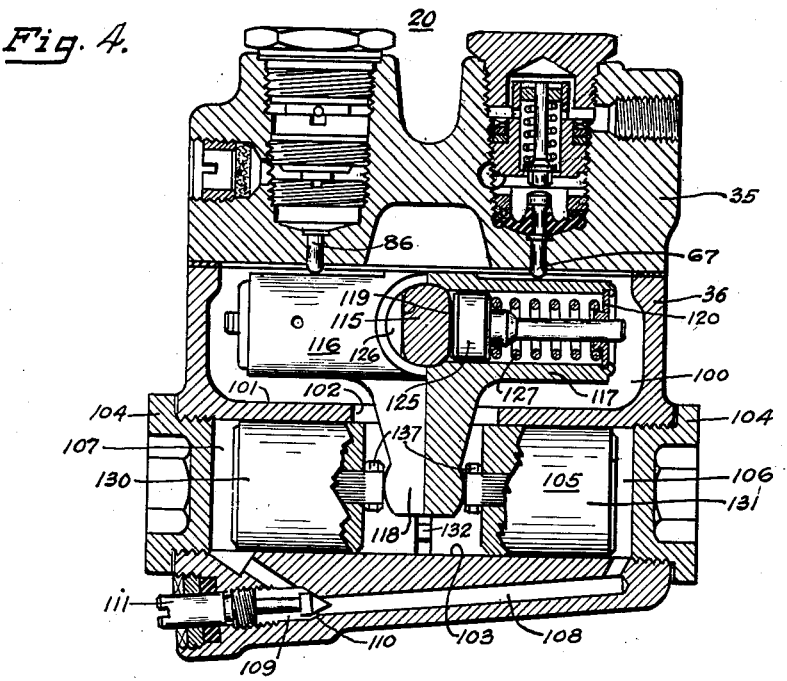
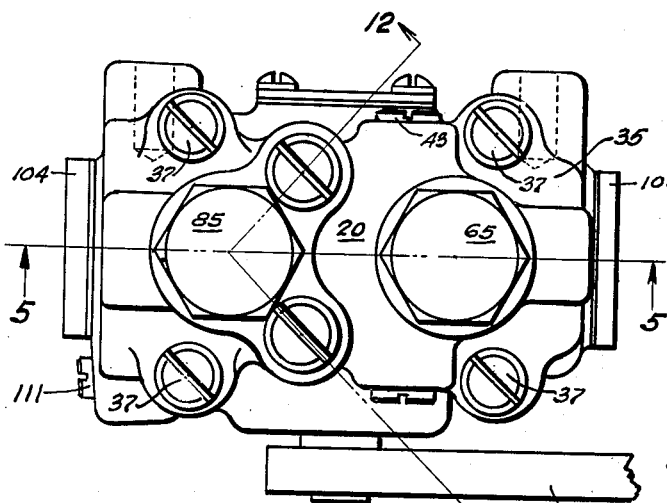
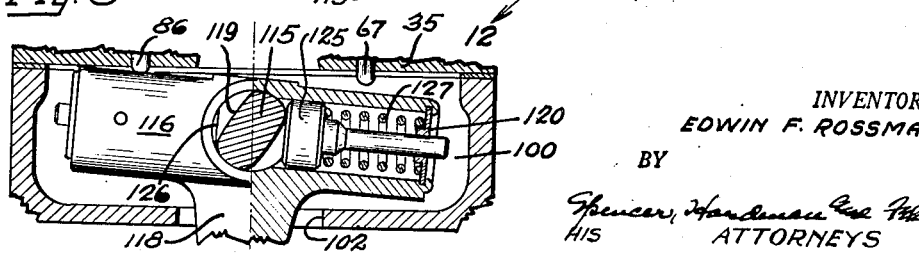
INVENTOR.
EDWIN F. ROSSMAN
BY
HIS ATTORNEYS

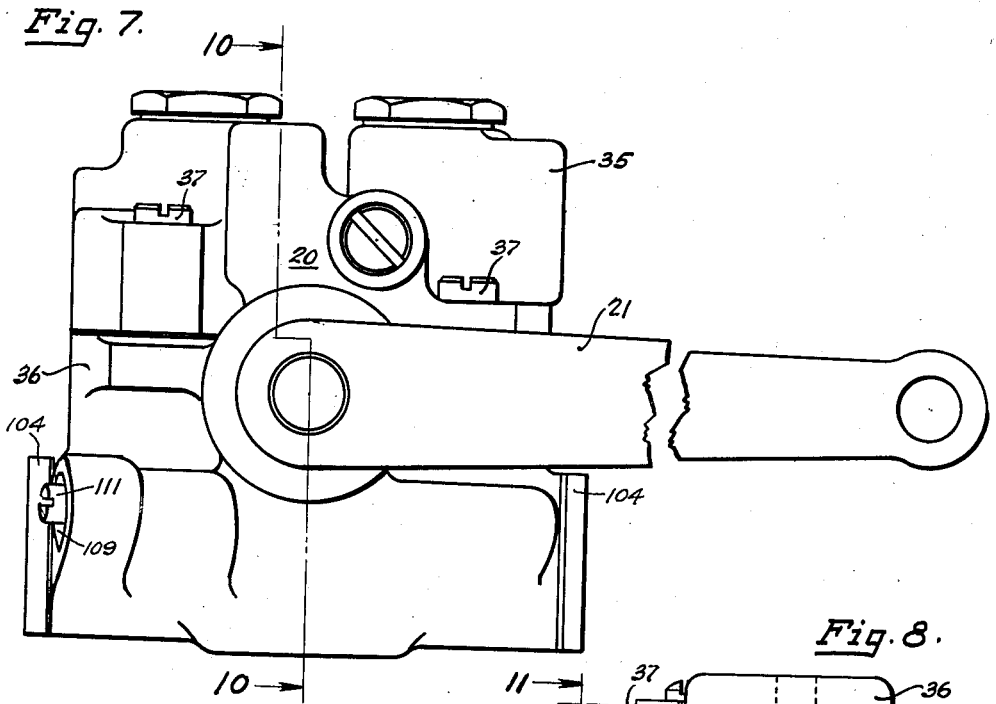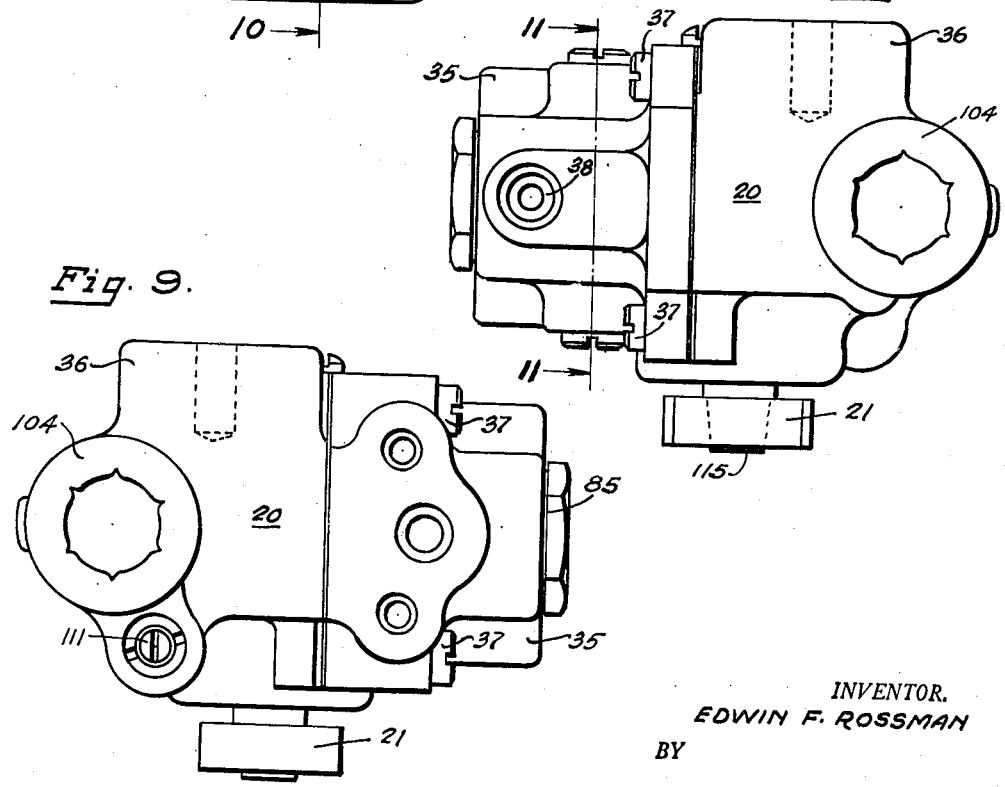

Feb. 23, 1954

E. F. ROSSMAN 2,670,201

CONTROL MECHANISM

Filed Jan. 29, 1948

INVENTOR.
EDWIN F. ROSSMAN
BY
HIS ATTORNEYS

Patented Feb. 23, 1954

2,670,201

UNITED STATES PATENT OFFICE 2,670,201

CONTROL MECHANISM

Edwin F. Rossman, Dayton, Ohio, assignor to General Motors Corporation, Detroit, Mich., a corporation of Delaware Application January 29, 1948, Serial No. 5,169

9 Claims. (Cl. 267—65)

This invention relates to an improved actuating mechanism for the control device of a pneumatic suspension system for motor vehicles.

The present invention is particularly adapted for use in connection with a vehicle suspension system in which air springs provide the resilient means for supporting the body of the vehicle upon its running gear or axles. The air spring may be in the form of an air cushion, a bellows or a piston and cylinder inflated or charged with a volume of fluid, preferably air, under sufficient pressure to support the body of the vehicle above the axle.

The total relative movement between the body and axle of a vehicle is limited by the construction of the suspension to meet certain specifications of height, space, appearance and operation of the vehicle. Some vehicles, such as passenger busses and the like, are operated under substantial load variations and if the air springs are permanently inflated for the average load, with no compensating controls such as are provided by the present invention, the vehicle will ride too low at full or excessive loads and too high at no load. Excessive loading will cause "bottoming," that is, the striking of the axles by the body supporting frame and under no load the vehicle rides too high for safe operation.

To get full benefit from the use of comfortable riding air springs and avoid "bottoming" or unsafe high riding conditions, it is necessary to adjust the air springs by inflation or deflation. For best results it is desirable to so inflate or deflate the air springs automatically in response to changes in the average riding clearance between the vehicle body carrying frame and the axles, thereby substantially maintain the said frame at its normal riding height regardless of load condition.

An object of the present invention is to provide an actuator for an air spring inflation or deflation control device operative only in response to predeterminately slow relative movements between the sprung and unsprung masses resulting from an increase or decrease of load above or below normal upon the sprung mass, said control device being ineffective in response to the faster and relatively shorter movements of said masses resulting from the operation of the vehicle over an uneven roadbed.

A still further object of the present invention is to provide an actuator for a unitary control device of simple structure and design, capable of controlling the inflation or deflation of air springs in accordance with increases or decreases in the normal load applied to the sprung mass of a vehicle in order to maintain said mass at a predetermined mean riding height, the device being readily adjustable to vary said mean riding height if desirable or necessary.

Further objects and advantages of the present invention will be apparent from the following description, reference being had to the accompanying drawings wherein a preferred embodiment is clearly shown.

In the drawings:

Fig. 4 is a sectional view taken substantially along the line 5—5 of Fig. 6, certain parts being shown in elevation and in the line of the section for the sake of clarity.

Fig. 5 is a fragmentary sectional view taken from Fig. 5, and showing the valve operating element in one of its valve actuating positions.

Fig. 6 is a plan view of the control device.

Fig. 7 illustrates the device in front elevation.

Fig. 8 is a view of one end of the device.

Fig. 9 is an end view opposite to that of Fig. 8.

Figure 1:
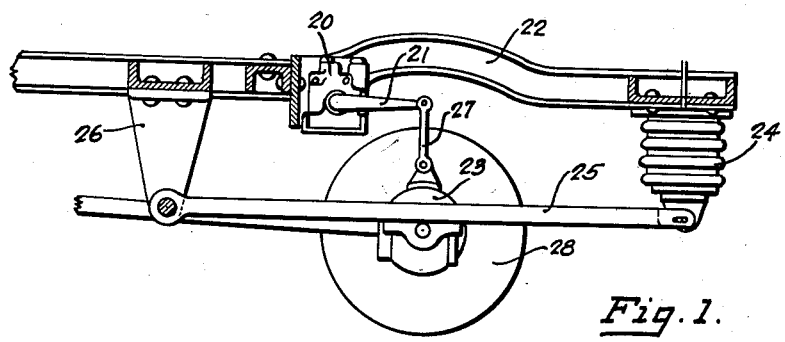
Fig. 1 is a fragmentary side view of the chassis of a vehicle equipped with the present invention.

Referring to the drawings the control device and its actuator of the present invention is shown as a unitary structure comprising a housing 20 in which an oscillatable lever 21 is journalled. The housing 20 is adapted to be attached to one of the two relatively movable members, the sprung mass or body carrying frame 22, while the lever 21 is adapted to be attached by suitable linkage to the other member, the unsprung mass or axle 23 of the vehicle. This is clearly illustrated in the Figs. 1, 2 and 3 which also show one method of supporting the frame 22 on the axle 23 by means of air springs 24 illustrated in the form of expansible or contractible bellows.

For purposes of illustrating one form of installation, the axle is shown having cross beams 25 supported thereon, one end of each beam being pivotally secured to a bracket 26 anchored to the frame 22, the other end of each beam being secured to the one end plate of an air spring 24, its other end plate engaging and supporting the frame 22. Any suitable linkage 27 secures the free end of the oscillatable lever 21 of the control device 20 to the axle 23. Road wheels 28 are provided on the axle 23.

Figure 2:
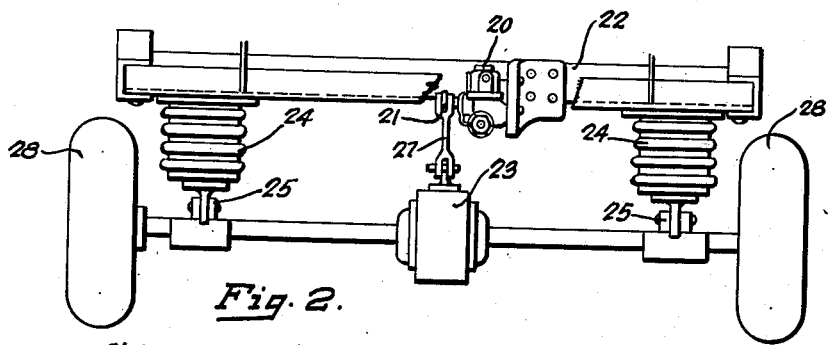
Fig. 2 is a rear view of the chassis shown in Fig. 1.

Assuming that the Figs. 1 and 2 show the vehicle frame 22 at the selected normal riding height, then loading of the vehicle would compress and deflect the bellows or air springs 24 by the lowering of the frame 22 due to the increased load. An extremely heavy load would so compress the air springs that possible striking of parts and damage would result. To avoid this the air springs may be inflated by the introduction of a fluid, preferably air, under pressure thereby lifting the frame 22. If the inflation is controlled in accordance with the load added to the frame 22, then the normal riding height of the frame 22, relatively to the axle, may be maintained under any load conditions.

If however, only inflation is controlled in accordance with the applied load removal of the load would permit the air springs 24 to expand and upon complete removal of the load the frame 22 would be raised substantially above the normal riding height and make operation of the vehicle, particularly at higher speed, extremely hazardous. On the other hand, however, if as the frame is raised by the air springs, due to the decrease in the load on the frame, the fluid or air pressure in the air springs is accordingly reduced, then said air springs are deflated in accordance with the diminishing load and the frame is consequently maintained at the normal riding height.

As has been stated, the device of the present invention is designed and constructed to control the inflation and deflation of air springs in accordance with the relative positions of the sprung and unsprung masses of a vehicle thereby substantially maintaining the sprung mass at a predetermined mean riding height regardless of the load thereon.

Figure 3:
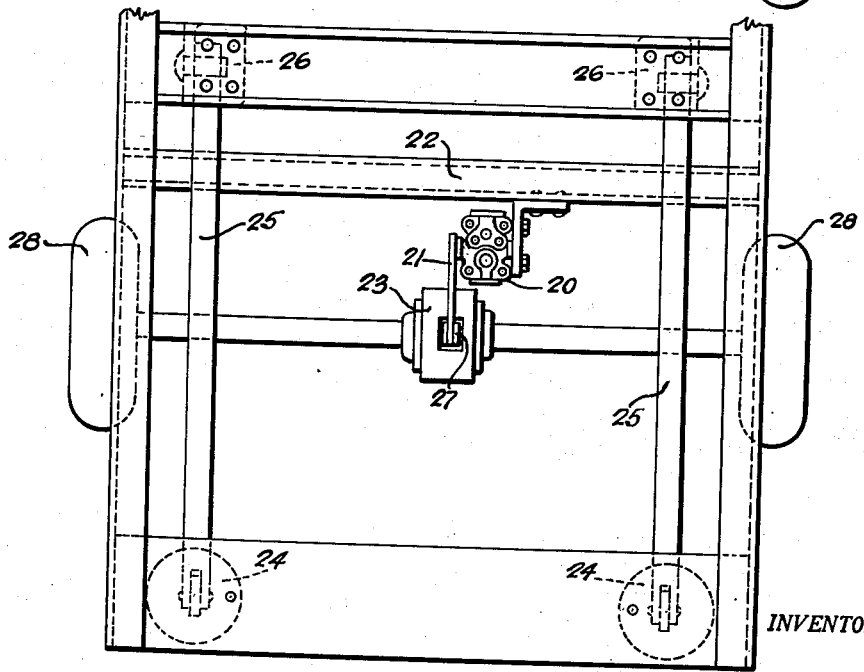
Fig. 3 is a plan view of the chassis section shown in Fig. 1.

The control mechanism of the present invention has been referred to as a unit and comprises two portions 35 and 36 secured together by bolts 37. The portion 35 of the device contains all the fluid or air passages and the controlling valves. The portion 36 contains the control valve actuating mechanism and the dampening device for resisting the movement of said control valve mechanism under predetermined conditions. Both portions 35 and 36, bolted together, form what has been termed "the housing" 20 which, as shown in Figs. 1, 2 and 3 is attached to the sprung mass or frame 22 of the vehicle.

Portion 35 of the housing has a threaded inlet port 38 for receiving one end of a conduit or pipe, the other end being connected to a reservoir, charged with air under pressure by a pump.

The housing portion contains suitable valving to be actuated, said valving having stems 67 and 86 extending from the housing portion 35 and being engageable by the actuator lever 116.

Figure 10:
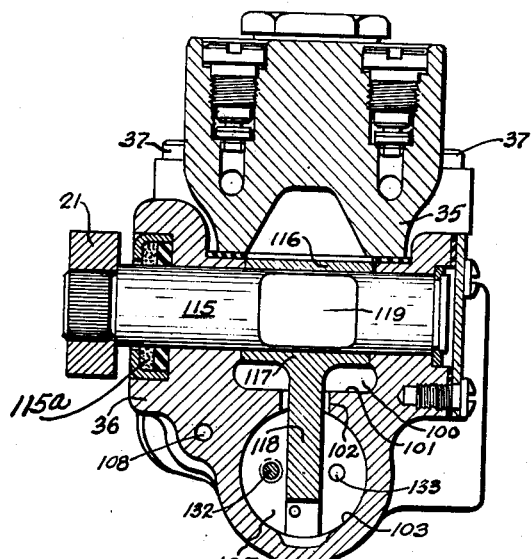
Fig. 10 is a sectional view taken substantially along the line 10—10 of Fig. 7.
Figure 11:
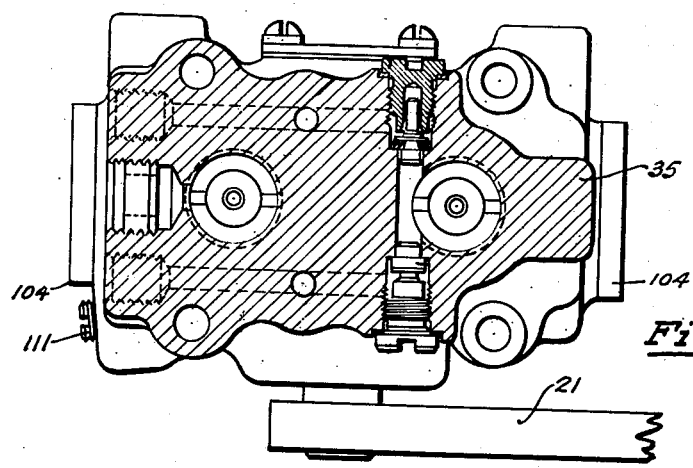
Fig. 11 is a sectional view taken substantially along the line 11—11 of Fig. 8.
Figure 12:
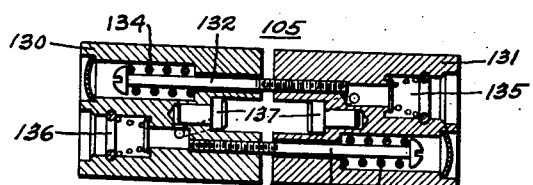
Fig. 12 is a longitudinal sectional view of the piston in the movement dampener mechanism of the device.

The housing portion 36 contains the mechanism for operating the inflation and deflation control valve stems 67 and 86. As shown in Figs. 4 and 10, portion 36 has a chamber 100, the one open side of which is clamped against the housing portion 35 by the bolts 37. As has been mentioned previously, the actuating pins 67 and 86 of the inflation and deflation control valve assemblies extend from said housing portion 35 into the chamber 100. The inner wall 101 opposite the open side of portion 36 has an opening 102 provided therein. A cylindrical passage 103, open at both ends, is provided in the portion 36 directly beneath the inner wall 101. Each end of the cylinder 103 is closed by a sealed screw plug 104. A piston 105 forms a fluid displacement chamber at each end of the cylinder 103, the one chamber being designated by the numeral 106, the other by numeral 107.

Adjacent the cylinder 103, housing portion 36 has a fluid passage 108 which connects the two fluid displacement chambers 106 and 107 thereby providing for the transfer of fluid between said chambers as the piston 105 is reciprocated in the cylinder 103. A bore 109 from outside the housing portion 36 communicates with the passage 108, forming an annular seat 110 at its point of communication with said passage. Bore 109 is interiorly threaded to receive an adjustable metering pin 111, the inner, tapered end of which being movable, by the turning of the pin 111, into selectable juxtaposition to the seat 110 to provide any desirable restriction to the flow of the incompressible fluid through passage 108 in either direction.

As shown in Figs. 5 and 10, a shaft 115 is journalled in the housing portion 36, transversely thereof and substantially equidistant from both actuating plungers 67 and 86 of the inflation and deflation valves 65 and 85 respectively. One end of shaft 115 extends through its bearing and an adjacent packing gland 115a, to the outside of the housing, this end of the shaft having the operating arm 21 attached thereto. The free end of this arm is adapted to be attached to the unsprung mass of the vehicle by a link 27 as shown in Figs. 1 to 3 inclusive. Link 27 is preferably provided with any suitable means for adjusting its length so that it may serve as an easily accessible means for altering the normal riding height of the vehicle as will be described later.

An oscillatable lever or walking beam 116 is supported upon the shaft 115 within the chamber 100 of the housing portion 36. Lever 116 is T-shaped. The cross-head portion 117 being tubular, the other standard portion being a cam extension 118 which projects through an opening 102 in the wall 101 into the cylinder 103. Shaft 115 extends through a transverse opening midway between the ends of the tubular cross-head portion 117 of the lever 116, the axis of said shaft 115 intersecting the longitudinal center of the tubular cross-head portion 117.

That portion of shaft 115 extending through lever 116 and particularly that portion of said shaft exposed inside the tubular cross-head portion has two diametrically opposite substantially flat cam surfaces 119 parallel to each other and equally spaced from the axis of the shaft. For purposes to be described the surfaces 119 are slightly arcuate, the corners where they meet the cylindrical surfaces of shaft 115 being rounded and all equidistant from the axis of the shaft.

To secure the lever 116 to the shaft, so that under certain conditions the lever 116 will oscillate with the shaft and under other conditions the shaft 115 may oscillate relatively to the lever, there is provided a yieldable torque connection. This torque connection comprises two plungers 125 and 126 on each side of the shaft and slidably carried in the tubular cross-head portion 117 of the lever 116. A head portion on each plunger slidably fits in the tubular cross-head 117 while a reduced stem portion extends through an opening in an end plate 120 secured in the respective ends of the tubular cross-head portion of the lever 116. A spring 127 surrounding the stem portion of each plunger is interposed between the head portions 125 and 126 respectively and the corresponding end plates 120, each spring urging its plunger into yieldable engagement with a respective flat cam surface of the shaft at a predetermined force.

Since the two cam surfaces 119 on the shaft are substantially flat and parallel to each other and the engaging surfaces of the respective plunger heads 125 and 126 are flat and parallel to each other, said spring loaded plungers normally will hold the lever 116 in a definite angular relation relatively to the shaft 115 and normally will cause the shaft and lever to oscillate together. Said spring loaded plungers yieldably oppose relative rotation between the shaft and lever and if such relative rotation does occur, the plungers will exert a substantially constant force tending to return the lever to its normal angular position relatively to the shaft. As the shaft is rotated and no external force is applied to the lever 116 to oppose its rotation with the shaft 115, as will later be described, said lever 116 or more particularly its cross-head portion 117 will engage one or the other valve actuating plungers 67 or 86, depending upon the direction of rotation of lever 116 by the shaft 115, moving the plunger to actuate either the inflation control valve pin 67 or the deflation control valve pin 86 respectively. Continued rotation of the lever 116 by shaft 115 in the one or the other direction as mentioned will eventually bring the one or the other end of the cross-head portion 117 of lever 116 into positive engagement with the immovable housing portion 35, the bottom surface of which forms the ceiling for the chamber 100 containing the lever 116, so that from thereon, the shaft must rotate relatively to the lever 116. Under these conditions diametrically opposite rounded corners of the flattened portions 119 of shaft 115 will commence to ride over the engaged surfaces of the plunger heads 125 and 126, see Fig. 5, forming two moment arms of equal length, acting to move said plungers against the equal opposing force of their springs 127. This provides a definite torque which maintains the lever in this operated position while the shaft is rotating relatively to said lever and at the same time provides a means which will quickly return the lever 116 to its normal angular position relatively to the shaft when the rotation of the shaft is again reversed. From the drawings Figs. 4 and 5 it may readily be seen that this torque connection is effective as described above when the shaft rotates in either direction.

The two substantially flat parallel cam surfaces 119 of shaft 115 are slightly arcuated to reduce operating noises to a minimum. The arcuated cam surfaces 119 effect a gradual increase in length of the moment arms actuating the plungers against the effect of their respective springs 127.

Thus the control device of the present invention is provided with a yieldable torque connection between its drive shaft and the valve actuating lever, said connection exerting a substantially constant, predetermined torque to move the said lever with the shaft a predetermined distance in either direction and maintaining said lever in the operated position while the shaft continues its rotation in this one direction, and during the reverse movement of the shaft until said shaft and lever assume their normal angular relation as shown in Fig. 4. Continued movement in this reverse direction results in the operation of the lever in the reverse direction in a like manner. Limiting the rotation of the lever 116 in either direction by permitting it to strike the bottom wall of the housing portion 35, the valve actuating plungers or pins 67 and 86 are actuated only a sufficient distance properly to open their respective valve. This arrangement also limits the range of movement of the cam lever portion 118 which actuates the piston of the hydraulic damper to be described. All this tends to increase the sensitivity of the device inasmuch as travel spans are limited and overtravel eliminated.

The present control device is designed to effect inflation or deflation of the air springs of the vehicle to which it is applied, only under certain conditions. When the device is installed on a vehicle, the housing 20 is attached to the sprung mass or vehicle frame while the operating arm 21 of the device is attached to the unsprung mass or vehicle axle by a link 27. Any approaching or separating movements of the sprung and unsprung masses of the vehicle will therefore cause relative movements between the housing and the operating arm 21 with its shaft 115 journalled in said housing. Due to such relative movements, the shaft 115 will be oscillated in its bearing in the housing.

Such approaching or separating movements of the sprung and unsprung masses of the vehicle, may be caused in two ways. One way is by varying the normal load on the sprung mass. Increasing the load on the sprung mass will cause it to move toward the unsprung mass thereby compressing the air springs. If this increased load is excessive, the danger of "bottoming," that is, striking of the frame on the axle of the vehicle is presented. The ordinary practice of overcoming this is to provide stiffer springs which tends to a harder, stiffer ride, or to raise the normal load riding level of the vehicle frame, which when no load is on the frame tends to raise the vehicle frame too high for safe operation especially at higher speeds. The relative movement of the sprung (vehicle frame) and unsprung (vehicle axle) masses due to variable loading is considerably slower than such movement caused by the vehicle striking ruts or bumps in the roadway over which it is being operated. These latter movements are very rapid at times and of small amplitude.

It is essential, and the control device of the present invention is designed and constructed, to effect inflation and deflation of the air springs in response only to predeterminately slow relative movements between the frame and axle of the vehicle caused by loading or unloading of the vehicle and to be completely ineffective to cause adjustments of the air springs in response to the more rapid movements of said frame and axle caused by operating the vehicle over an irregular road surface.

In order that the inflation valve 65 is actuated to permit inflation of the air springs only in response to predeterminately slow movement of the sprung mass toward the unsprung mass due to increasing load on said sprung mass and the deflation control valve 85 is actuated to deflate the air springs only in response to predeterminately slow separating movements of the sprung and unsprung masses due to decreasing the load on the sprung mass, and in order that the more rapid and of less amplitude movements of said masses due to road conditions will not be effective to cause the said valves to be actuated, the device is provided with a movement dampener or impeding mechanism which, combined with the yieldable connection between the shaft and lever 116, forms in effect a time delay device which permits the control device to be effective at slow movements of the sprung and unsprung masses and ineffective at the faster movements thereof.

This movement dampener or impeding mechanism comprises a two piece piston 105 reciprocative in the cylinder 103 of housing portion 36. Piston 105 consists of two cylindrical blocks 130 and 131 tied together by two bolts 132 and 133. Bolt 132 slidably extends through block 130 and is threaded to block 131 while bolt 133 slidably extends through block 131 and is threaded to block 130. A spring 134 is interposed between the head of bolt 132 and block 130 and a similar spring is interposed between the head of bolt 133 and the block 131. These springs urge the blocks toward each other so that the wear pieces 137 secured in recesses in the adjacent surfaces of blocks 130 and 131 are urged into constant engagement with the cam portion 118 of the lever 116. Each piston block has a through passage connecting the respective fluid displacement chamber, formed in the cylinder by said block, with the fluid reservoir space between the two blocks. The passage in block 130 is designated by the numeral 136 and the one in block 131 by the numeral 135. Each passage has a one way check valve which permits fluid to flow from the central reservoir space between the pistons into the respective fluid displacement chambers 106 or 107, but not from said chambers into the reservoir. Thus any shortage of fluid in either one of said chambers 106 and 107 due to fluid leakage, will be compensated for by said check valves.

From the aforegoing description it may be seen that the lever 116 is mechanically connected to the reciprocative piston 105 of the movement dampener and thus any tilting movement of said lever or walking beam in either direction, is transmitted to the piston 105 causing it to displace fluid from one displacement chamber through the restricted passage 108 into the opposite displacement chamber.

As has been mentioned previously, the yieldable torque device connecting the lever 116 to shaft 115 and the dampening device including fluid displacement piston 105, form in effect a time delay device which causes the control mechanism to function in the desired manner. Since the yieldable torque drive exerts a relatively constant torque to move the walking beam 116 with the shaft 115, it also exerts a relatively constant force at the end of the cam extension 118 to move the piston 105 in cylinder 103. This movement of the piston 105 causes fluid to be displaced from one displacement chamber through the predeterminately restricted passage 108 into the opposite displacement chamber. Since the actuating force is relatively constant, a definite maximum period of time is required for a piston movement sufficient to effect operation of the control valves through a corresponding angular movement of cam 118 and walking beam or lever 116. Accordingly, slow relative movements between the sprung and unsprung masses due to variation in load on the sprung mass cause a force in one direction to be applied to piston 105 for a sufficient length of time to effect control valve operation. On the other hand, insufficient time is allowed for valve operation when the relative movements of the sprung and unsprung masses are caused by vehicle operation, especially on an uneven road after inflation or deflation has been completed for any load change and the normal riding clearance obtained. These high rate movements are not only of short duration, but also cause equal forces of substantially equal duration to be applied to the dampener piston 105 through the yieldable torque drive successively in opposite directions tending to maintain the piston 105 and walking beam 116 in one position. If the vehicle is operated before inflation or deflation has been completed these high rate movements will also have no effect on the position of the walking beam or lever 116 and the control valve operation since the force on the dampener piston 105, due to the yieldable torque drive, will favor the relative movement due to load change and persist over a longer period in that direction than in the other until inflation or deflation of the air springs has been completed.

The control device of the present invention is designed to become effective to cause inflation or deflation of the air springs when the spring mass is lowered or raised below or above the selected normal riding height. More specifically, it is not desirable that inflation or deflation be effected immediately upon an increase or decrease of load. On the contrary, the present device is designed and constructed to permit the valve actuating lever 116 to move through an idle range or what might be termed a "dwell" during which it is not effective to actuate the valves. This permits a predetermined increase or decrease in load on the sprung mass before the device becomes effective to start inflation or deflation of the air springs. With respect to the outer end of operating arm 21, this idle range of movement or "dwell" is the distance or angle through which the arm may be moved after one of the control valves is closed and the other control valve starts to open.

After the device is attached to the vehicle, the link 27, preferably equipped with a length adjusting means, may be adjusted to provide for the desired normal load riding height. If this height is to be raised, the link is lengthened and if it be desired to lower the normal load riding height, the link must be shortened.

Operation of the device

At a selected normal load, the sprung mass or frame of the vehicle is at a predetermined height, that is, it is a predetermined distance above the unsprung mass, the axle of the vehicle, for purposes of this description a passenger bus. As passengers board the bus the load thereon is increased and the sprung mass is moved downwardly toward the unsprung mass. This causes a counter-clockwise rotation of shaft 115, by operating lever 21 and inasmuch as this movement is slow, the lever 116 will move with the shaft and likewise piston 105 of the dampener will move to the right as regards Fig. 4. As aforedescribed, lever 116 may be moved through a certain range of movement from its dead center position as shown in Fig. 4 before its inflation valve stem is engaged by the actuating plunger 67 and moved thereby to open communication between the source of fluid pressure and the air springs. Thus a predetermined increase in the normal load of the bus is necessary before the air spring inflation operation is started. When the right end of lever 116 strikes the bottom surface of housing portion 35, counter-clockwise rotation of lever 116 by shaft 115 is arrested, however, if the lever 21 and its shaft 115 continues to rotate counterclockwise, as regards Fig. 5, due to load application, the yieldable torque connection will yield to permit relative rotation between shaft 115 and lever 116, but said connection will still exert sufficient torque to hold the lever in the inflation valve actuating position.

As the air springs are being inflated, their expansion, due to such inflation, will cause the sprung mass to be lifted toward the mean riding height. This results in a consequent clockwise rotation of the arm 21 and shaft 115 which, due to the torque connection immediately rotates the lever 116 clockwise to return it to the dead center position in which the inflation control valve is again fully closed. Therefore the sprung mass with its added load is again maintained at its normal or mean riding height. If additional passengers board the bus, the additional load will again cause the aforedescribed inflation operation to be repeated.

If however, the load is reduced by the discharge of passengers, then the air springs will expand and lift the sprung mass away from the unsprung mass. As this occurs, the arm 21 and its shaft will be rotated clockwise as regards Figs. 3 and 4. Now lever 116 will be moved into the position as shown in Fig. 5, in which the deflation control valve mechanism is fully opened to permit communication of the air springs with the exhaust port to atmosphere. This permits air pressure from said air springs to escape and results in a deflation of the air springs and a consequent lowering of the sprung mass. As the sprung mass moves toward the unsprung mass due to such deflation of the air springs, the shaft 115 and its arm 21 will again be rotated counterclockwise. This will cause the return of lever 116 to its normal dead center position in which both inflation and deflation control valves are inoperated and closed. Again the sprung mass is in its normal or mean riding height position.

As long as the load on the sprung mass is maintained, substantially no inflation or deflation of the air springs will obtain. However, if this load is increased or decreased, or if the masses are moved relatively at a rate and amplitude corresponding to those caused by load variations, then the device of the present invention becomes operative to effect inflation or deflation of the air springs respectively to return the sprung mass to the mean riding level under the changed conditions and retain it there as long as said conditions exist.

While the embodiment of the present invention as herein disclosed, constitutes a preferred form, it is to be understood that other forms might be adopted, all coming within the scope of the claims which follow.

What is claimed is as follows:

1. A mechanism for controlling the action of two normally inactive control devices, said mechanism consisting of an oscillatable lever tiltable in one direction to engage and render the said one control device active and in the other direction to render said other device operative; an oscillatable shaft carrying said lever so as to be tiltable thereon; a predeterminately yieldable torque connection between said shaft and lever normally effecting movement of the lever with the shaft; and a movement dampening device attached to said lever and effective to cause the torque connection to yield at predetermined oscillating speeds and amplitudes of the shaft.

2. An actuator for operating one or the other of two control devices, said actuator consisting of an oscillatable shaft; a lever on said shaft and rotatable relatively thereto, said lever being operative to engage and actuate one or the other of said control devices dependent upon the direction of lever rotation; a yieldable torque connection between said shaft and lever, normally effecting rotation of the lever with the shaft; and a movement dampener connected to and operated by said lever, said dampener impeding the movements of said lever to effect yielding of said torque connection and thereby relative rotation of the shaft to the lever at predetermined oscillating speeds of the shaft.

3. An actuator for operating one or the other of two control devices, said actuator consisting of an oscillatable shaft; a lever supported by said shaft so as to be rotatable relatively thereto, said lever being operative to engage and actuate either control device; a movement controlling dampener operatively engaged by said lever; and a resilient connection between the lever and shaft, operatively securing the lever to the shaft for effecting their unified rotation during normal oscillations of said shaft, but, under the influence of the dampener, yielding and permitting the shaft to oscillate relatively to the lever when said shaft oscillations are at a predetermined rate and amplitude.

4. An actuator for operating one or the other of two control devices, said actuator consisting of an oscillatable shaft; a lever carried by the shaft and rotatable relatively thereto, said lever being operative to engage and actuate either of said devices; means supported by the lever and engaging the shaft, said means yieldably securing the lever to the shaft so that normally one rotates with the other; and a movement impeding device operatively connected to the lever and being operative to render said means ineffective to secure the lever to the shaft when the oscillations of said shaft attain a rate exceeding a predetermined normal.

5. An actuator for operating one or the other of two control devices, said actuator consisting of a housing supporting an oscillatable shaft; a three armed lever in said housing, supported by the shaft so as to be rotatable relatively thereto, two arms of said lever being adapted to engage and actuate said control devices respectively when the lever is moved by the shaft; a yieldable torque connection normally completely securing the said lever to the shaft for transmitting oscillatory movements of the shaft to the lever; and a movement dampener in the housing, engaged by the third arm of the lever and movable thereby, said dampener being operative to resist oscillations of the lever by the shaft when said oscillations exceed a predetermined rate, whereby the effect of the torque connection completely to secure the lever to the shaft is overcome.

6. An actuator for operating one or the other of two control devices, said actuator consisting of a housing supporting an oscillatable shaft; a three armed lever in said housing, supported by the shaft so as to be rotatable relatively thereto, two arms of said lever being adapted to engage and actuate said control devices respectively when the lever is moved by the shaft; a yieldable torque connection carried by the lever and engaging the shaft for yieldably securing the lever to the shaft normally to effect their concurrent rotation; and an hydraulic dashpot in the housing, said dashpot having a fluid displacement element engaged and moved by the third arm of said lever, said dashpot impeding the movements of the lever to effect yielding of the torque connection and rotation of the shaft relatively to the lever at predetermined oscillating speeds of the shaft.

7. An actuator operative in opposite directions for moving control devices, said actuator consisting of a housing; a shaft supported in the housing so as to be oscillatable; a T-shaped lever, the cross arm portion of which is tubular, said portion intermediate its two ends, having a transverse opening through which an oppositely disposed flattened portion of the shaft extends, rotatably to support said lever on the shaft; a spring loaded element in the hollow portion of the lever, on each side of the shaft, each element being urged upon an adjacent flat surface provided on the shaft for yieldably securing the lever to said shaft so that normally the lever is oscillated with the shaft; and a motion dampening device in the housing, engaged and actuated by the upright portion of the lever, said device consisting of a closed end cylinder provided by the housing and containing a fluid displacement piston connected with the lever and forming oppositely disposed fluid displacement chambers, the housing having a valved duct connecting both said displacement chambers to provide a fluid restricting connection therebetween, said dampening device impeding the movements of the lever to effect relative movement of the shaft and lever when the oscillations of said lever exceed a predetermined rate and amplitude.

8. A mechanism for actuating two normally inactive control devices, said mechanism comprising in combination, a housing; an oscillatable shaft supported by said housing; an actuating arm secured to the shaft exteriorly of the housing; a second lever, within the housing, carried by the shaft so as to be rotatable relatively thereto, said second lever being movable to engage one or the other of said control devices to activate them; means on the second lever yieldably to secure the second lever to the shaft to effect oscillation of the lever with the shaft; and a movement impeding device in the housing, operatively connected to the second lever for impeding its movements and causing said means to yield and release the shaft to permit it to oscillate at speeds in excess of those at which said means is effective to maintain operating connections between the shaft and second lever.

9. In an air spring system for supporting a sprung mass relative to an unsprung mass and having separate valves for controlling supply of air to the system and exhaust of air from the system to maintain the spring system in a substantially uniform operating position irrespective of the loading condition upon the system, the improvement in the actuating control for separately operating the valves controlling supply and exhaust of air in the system, comprising, an oscillatable shaft for connection with a movable mass of the air spring system for oscillation thereof upon relative movement between the sprung mass and the unsprung mass with which the control is to be connected, an operating member carried on said shaft and oscillatable thereon in the same directions of oscillation as said shaft for controlling separately actuation of the valves of the air spring system by the oscillations of the member, a yieldable torque connection between said shaft and said member normally to maintain identical oscillation of said member with said shaft, and a movement dampening device operably engaged by said member to resist normally identical oscillation of said member with said shaft above predetermined oscillating speeds and amplitudes of oscillation to avoid actuation of the valves of the air spring system above such predetermined oscillating speeds and amplitudes, said torque connection yielding to permit of such oscillations of said shaft relative to said member and to also maintain connection between said member and said shaft for identical oscillation of said member with said shaft below said predetermined oscillating speeds and amplitudes for actuation of the valves of the spring system in response thereto.

EDWIN F. ROSSMAN.

References Cited in the file of this patent

UNITED STATES PATENTS

| Number | Name | Date |
|---|---|---|
| 1,244,752 | McCrosson | Oct. 30, 1917 |
| 1,664,510 | Hughes | Apr. 3, 1928 |
| 1,760,006 | Ryder | May 27, 1930 |
| 2,021,043 | Bedford | Nov. 12, 1935 |
| 2,270,951 | Jeffrey | Jan. 27, 1942 |
| 2,336,425 | Shenton | Dec. 7, 1943 |
| 2,361,575 | Thompson | Oct. 31, 1944 |
| 2,401,501 | Olah | June 4, 1946 |

FOREIGN PATENTS

| Number | Country | Date |
|---|---|---|
| 444,540 | Great Britain | Mar. 23, 1936 |